United States Patent
Ryoo et al.

(10) Patent No.: US 11,111,377 B2
(45) Date of Patent: Sep. 7, 2021

(54) RESIN COMPOSITION

(71) Applicant: LG CHEM, LTD., Seoul (KR)

(72) Inventors: Seung Cheol Ryoo, Daejeon (KR);
Sung Hwan Yoon, Daejeon (KR);
Hyun Ki Kim, Daejeon (KR); Seong Lyong Kim, Daejeon (KR); Jin Oh Nam, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/642,002

(22) PCT Filed: Nov. 23, 2018

(86) PCT No.: PCT/KR2018/014514
§ 371 (c)(1),
(2) Date: Feb. 25, 2020

(87) PCT Pub. No.: WO2019/103519
PCT Pub. Date: May 31, 2019

(65) Prior Publication Data
US 2020/0239682 A1 Jul. 30, 2020

(30) Foreign Application Priority Data
Nov. 24, 2017 (KR) .................. 10-2017-0158627

(51) Int. Cl.
| C08L 55/02 | (2006.01) |
| C08L 23/08 | (2006.01) |
| C08L 25/12 | (2006.01) |
| C08L 33/24 | (2006.01) |
| C08L 51/00 | (2006.01) |

(52) U.S. Cl.
CPC ........... *C08L 55/02* (2013.01); *C08L 23/0815* (2013.01); *C08L 25/12* (2013.01); *C08L 33/24* (2013.01); *C08L 51/003* (2013.01); C08L 2201/08 (2013.01); C08L 2205/035 (2013.01); C08L 2207/53 (2013.01)

(58) Field of Classification Search
CPC ...... C08L 23/0815; C08L 25/12; C08L 55/02; C08L 2205/03; C08L 51/06; C08L 51/003
See application file for complete search history.

(56) References Cited

U.S. PATENT DOCUMENTS

| 2007/0254122 A1 | 11/2007 | Inoue et al. |
| 2013/0217817 A1 | 8/2013 | Mochizuki et al. |
| 2016/0185949 A1 | 6/2016 | Mochizuki et al. |
| 2017/0260382 A1 | 9/2017 | Lee et al. |
| 2017/0292017 A1 | 10/2017 | Jung et al. |

FOREIGN PATENT DOCUMENTS

| EP | 3187539 A1 | 7/2017 |
| JP | H09263663 A | 10/1997 |
| JP | H1072546 A | 3/1998 |
| JP | H11228767 A | 8/1999 |
| JP | 2002038034 A | 2/2002 |
| JP | 2011219557 A | 11/2011 |
| JP | 2011219558 A | 11/2011 |
| JP | 2012046669 A | 3/2012 |
| JP | 2013112783 A | 6/2013 |
| JP | 2014133896 A | 7/2014 |
| JP | 2014177656 A | 9/2014 |
| KR | 20010018020 A | 3/2001 |
| KR | 20080041363 A | 5/2008 |
| KR | 20160064864 A | 6/2016 |
| WO | 2007108379 A1 | 9/2007 |

OTHER PUBLICATIONS

Cheil Industries, electronic translation of KR 20010018020, Aug. 1999.*
Search Report dated Apr. 25, 2019 for PCT Application No. PCT/KR0218/014514.
Extend European Search Report for EP18880701, dated Nov. 30, 2020.

* cited by examiner

*Primary Examiner* — Jeffrey C Mullis

(57) ABSTRACT

The present invention relates to a resin composition including (1) 80 wt % to 99.8 wt % of a butadiene-based graft copolymer mixture; (2) 0.1 wt % to 10 wt % of a graft copolymer including a derived unit from a polyolefin-based polymer, a derived unit from a vinyl cyanide compound and a derived unit from an aromatic vinyl-based compound; and (3) 0.1 wt % to 10 wt % of an alpha olefin-based copolymer.

17 Claims, No Drawings

RESIN COMPOSITION

CROSS-REFERENCE TO RELATED APPLICATIONS

The present application claims the benefit of priority based on Korean Patent Application No. 10-2017-0158627, filed on Nov. 24, 2017, the entire contents of which are incorporated herein by reference.

TECHNICAL FIELD

Technical Field

The present invention relates to a resin composition, and more particularly, to a resin composition including an ABS-based thermoplastic resin composition, a graft copolymer and an alpha olefin-based copolymer, and having excellent mechanical properties and processability and small changes of frictional sound generation according to the environmental changes.

Background Art

Acrylonitrile-butadiene-styrene (ABS) resins have excellent processability, moldability, impact resistance, strength and gloss, and are widely used in various electric, electronic and miscellaneous parts. Recently, as the use development direction of the ABS resins change from diversification mainly with functionality to multi-functionalization and complexification, requirement on a resin possessing complex function is gradually increasing.

Particularly, ABS resins have excellent dimensional stability, processability and chemical resistance, and are widely used as materials for monitor housings, game console housings, household appliances, office products, lamp housings for a car, etc. Recently, study on imparting ABS resins having excellent impact resistance, chemical resistance and processability with heat resistance and low gloss so as to use thereof as interior materials of cars is conducted a lot.

The ABS resin is often molded into each part and then assembled to use, and in an assembled state of each part, vibration or shock may be often applied while being contracted or expanded to each part, and in this case, harsh frictional sound may be generated. Recently, as products are gentrified, good products with emotional quality, which generates little smell and noise are required, and accordingly, requirement on materials generating little noise during friction increases in respect of raw materials mainly with automobile companies. Therefore, attempts for developing raw materials generating little frictional sound are conducted mainly with raw material production companies. For example, Japanese Patent Laid-open No. 2012-046669 discloses a frictional sound-decreasing resin which reduces frictional sound by mixing a polymer obtained by removing double bonds of a diene by grafting an EPDM resin with a SAN resin and adding hydrogen, with an ABS resin. However, the producing process of the frictional sound-decreasing resin is complicated, and from actual tests, a RPN value which is an index of frictional sound properties is 3 or less and very excellent before aging, but the RPN value after aging is sometimes 3 or more. Accordingly, consistent and practical effects of decreasing frictional sound are somewhat imperfect.

Accordingly, the development of a novel resin composition, of which manufacturing process is simple, and which has small decrease of the physical properties of an ABS resin, excellent processability, and small changes of frictional sound generation according to the environmental changes, is required.

DISCLOSURE OF THE INVENTION

Technical Problem

An object of the present invention is to provide a resin composition, of which manufacturing process is simple, and which has a little decrease of the physical properties of an ABS resin, excellent processability, and small changes of frictional sound generation according to the environmental changes.

Technical Solution

To solve the above-mentioned tasks, the present invention provides a resin composition including (1) 80 wt % to 99.8 wt % of a butadiene-based graft copolymer mixture; (2) 0.1 wt % to 10 wt % of a graft copolymer including a derived unit from a polyolefin-based polymer, a derived unit from a vinyl cyanide compound, and a derived unit from an aromatic vinyl compound; and (3) 0.1 wt % to 10 wt % of an alpha olefin-based copolymer.

Advantageous Effects

The resin composition of the present invention has a simple production process, a little degradation of the physical properties of an ABS resin, excellent processability and small changes of frictional sound generation according to the environmental changes.

BEST MODE FOR CARRYING OUT THE INVENTION

Hereinafter, the present invention will be described in more detail in order to assist the understanding of the present invention.

It will be understood that words or terms used in the description and claims of the present invention shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

The resin composition of the present invention comprises (1) 80 wt % to 99.8 wt % of a butadiene-based graft copolymer mixture; (2) 0.1 wt % to 10 wt % of a copolymer including a derived unit from a polyolefin-based polymer, a derived unit from a vinyl cyanide compound and a derived unit from an aromatic vinyl compound; and (3) 0.1 wt % to 10 wt % of an alpha olefin-based copolymer.

The resin composition according to the present invention is a combination of (1) the butadiene-based graft copolymer mixture with (2) the graft copolymer including the derived unit from a polyolefin-based polymer, the derived unit from a vinyl cyanide compound and the derived unit from an aromatic vinyl compound and (3) an alpha olefin-based copolymer. Since (3) the alpha olefin-based copolymer has low compatibility with various materials, and reduces adhesiveness on friction and absorbs accumulated mechanical energy to effectively reduce frictional sound, and (2) the graft copolymer including the derived unit from a polyolefin-based polymer, the derived unit from a vinyl cyanide compound and the derived unit from an aromatic vinyl compound increases the compatibility between (1) the butadiene-based graft copolymer and (3) the alpha olefin-based copolymer to increase the stability of a resin, and show effective and consistent effects of decreasing frictional sound.

Detailed description on each component is as follows.

(1) Butadiene-Based Graft Copolymer Mixture

In the resin composition of the present invention, the butadiene-based graft copolymer may be, for example, a butadiene-based graft copolymer including a butadiene-based rubbery polymer core and a graft shell including a derived unit from a vinyl cyanide compound and a derived unit from an aromatic vinyl compound, and may be a butadiene-based graft copolymer additionally including a derived unit from a compound other than the butadiene-based rubbery polymer, the derived unit from a vinyl cyanide compound and the derived unit from an aromatic vinyl compound, thereby improving physical properties such as flame retardant properties, heat resistant properties and non-glossy properties.

The resin composition of the present invention may comprise (1) the butadiene-based graft copolymer mixture in an amount of 80 wt % to 99.8 wt %, particularly, 85 wt % to 99.4 wt %, more particularly, 90 wt % to 99 wt % based on the total weight of the resin composition.

Meanwhile, in an embodiment of the present invention, (1) the butadiene-based graft copolymer mixture may include (A) a first butadiene-based graft copolymer including 40 wt % to 70 wt % of a butadiene-based rubbery polymer core and 30 wt % to 60 wt % of a graft shell including a derived unit from a vinyl cyanide compound and a derived unit from an aromatic vinyl compound; and (B) a second butadiene-based graft copolymer including 5 wt % to 30 wt % of a butadiene-based rubbery polymer core and 70 wt % to 95 wt % of a graft shell including a derived unit from a vinyl cyanide compound and a derived unit from an aromatic vinyl compound; and may further include (C) a copolymer including a derived unit from a vinyl cyanide compound and a derived unit from an aromatic vinyl compound.

(A) The first butadiene-based graft copolymer may include the butadiene-based rubbery polymer core in an amount of 40 wt % to 70 wt %, particularly, 55 wt % to 65 wt %, and the graft shell including the derived unit from a vinyl cyanide compound and the derived unit from an aromatic vinyl compound in an amount of 30 wt % to 60 wt %, particularly, 35 wt % to 45 wt %.

The first butadiene-based graft copolymer may be purchased and used, or may be prepared and used. In an embodiment of the present invention, the first butadiene-based graft copolymer may be prepared by emulsion polymerization.

The average particle diameter ($D_{50}$) of the butadiene-based rubbery polymer core may be suitably controlled according to glossiness and mechanical properties required, and in an embodiment of the present invention, the first butadiene-based graft copolymer may include a rubbery polymer having an average particle diameter of 0.1 μm to 0.4 μm, particularly, 0.25 μm to 0.35 μm as the butadiene-based rubbery polymer core. If the average particle diameter ($D_{50}$) is smaller than the above-mentioned range, impact strength and environment stress crack resistance may be degraded, and if the average particle diameter ($D_{50}$) is greater than the above-mentioned range, rubber manufacturing time may increase and gloss may be degraded.

(B) The second butadiene-based graft copolymer may include the butadiene-based rubbery polymer core in an amount of 5 wt % to 30 wt %, particularly, 5 wt % to 15 wt %, more particularly, 10 wt % to 15 wt %, and the graft shell including the derived unit from a vinyl cyanide compound and the derived unit from an aromatic vinyl compound in an amount of 70 wt % to 95 wt %, particularly, 85 wt % to 95 wt %, more particularly, 85 wt % to 90 wt %.

The second butadiene-based graft copolymer may be purchased and used, or may be prepared and used. In an embodiment of the present invention, the second butadiene-based graft copolymer may be prepared by bulk polymerization.

In an embodiment of the present invention, the second butadiene-based copolymer may include a rubbery polymer having an average particle diameter of 0.8 μm to 6 μm, particularly, 1 μm to 3.5 μm as the butadiene-based rubbery polymer core. If the average particle diameter of the butadiene-based rubbery polymer core is smaller than the above-mentioned range, impact strength and environment stress crack resistance may be degraded, and if the average particle diameter is greater than the above-mentioned range, rubber manufacturing time may increase and interparticle distance may increase, and thus, impact strength and gloss may be degraded.

If the second butadiene-based graft copolymer is included in (1) the butadiene-based graft copolymer mixture, frictional sound may decrease, impact strength may be improved due to a greater molecular weight than the first butadiene-based graft copolymer, and smell of the resin composition may be improved due to a small remaining monomer (remaining compound) content.

In each of the first butadiene-based graft copolymer and the second butadiene-based graft copolymer, the butadiene-based rubbery polymer may be polybutadiene or polybutadiene derivatives. The polybutadiene derivative may include a copolymerized product of 85 wt % to 99 wt % of polybutadiene with 1 wt % to 15 wt % of one or more selected from the group consisting of styrene, acrylonitrile and an organosilane compound, as necessary.

In addition, in each of the first butadiene-based graft copolymer and the second butadiene-based graft copolymer, the vinyl cyanide compound in the derived unit from a vinyl cyanide compound may include one or more selected from the group consisting of acrylonitrile methacrylonitrile and the derivatives thereof, particularly, acrylonitrile.

In addition, in each of the first butadiene-based graft copolymer and the second butadiene-based graft copolymer, the aromatic vinyl compound in the derived unit from an aromatic vinyl compound may include one or more selected from the group consisting of styrene, α-methylstyrene, vinyltoluene, alkyl styrene which is substituted with a $C_{1-3}$ alkyl group (for example, o-methylstyrene, m-methylstyrene, p-methylstyrene, p-ethylstyrene, etc.) and styrene which is substituted with halogen, particularly, styrene.

Meanwhile, (C) the copolymer including the derived unit from a vinyl cyanide compound and the derived unit from an aromatic vinyl compound may be used alone, or as a mixture of two or more having different molecular weights.

In an embodiment of the present invention, (C) the copolymer including the derived unit from a vinyl cyanide compound and the derived unit from an aromatic vinyl compound may include the derived unit from a vinyl cyanide compound in an amount of 20 wt % to 40 wt %, particularly, 25 wt % to 35 wt %.

If (C) the copolymer including the derived unit from a vinyl cyanide compound and the derived unit from an aromatic vinyl compound includes the derived unit from a vinyl cyanide compound in the above-mentioned range, compatibility with a copolymer including a derived unit from a polyolefin-based polymer, a derived unit from a vinyl cyanide compound and a derived unit from an aromatic vinyl compound may be improved, and thus, excellent balance among physical properties may be maintained and exfoliation phenomenon of alpha olefin may be prevented. In addition, if the amount of the derived unit from a vinyl cyanide compound increases, chemical resistance and mechanical properties may be improved, and if the amount of the derived unit from an aromatic vinyl compound increases, flowability may be improved and an extrusion process may be easily performed.

In an embodiment of the present invention, (C) the copolymer including the derived unit from a vinyl cyanide compound and the derived unit from an aromatic vinyl compound may have a glass transition temperature of 100° C. to 150° C., particularly, a glass transition temperature of 100° C. to 130° C.

If (C) the copolymer including the derived unit from a vinyl cyanide compound and the derived unit from an aromatic vinyl compound has the glass transition temperature in above-mentioned range, polymerization may be smooth and excellent balance among physical properties may be maintained.

The aromatic vinyl compound in (C) the copolymer including the derived unit from a vinyl cyanide compound and the derived unit from an aromatic vinyl compound may include one or more selected from the group consisting of styrene, α-methylstyrene, vinyltoluene, alkyl styrene which is substituted with a $C_{1-3}$ alkyl group (for example, o-methylstyrene, m-methylstyrene, p-methylstyrene, p-ethylstyrene, etc.) and styrene which is substituted with halogen, particularly, α-styrene. If the aromatic vinyl compound includes α-methylstyrene, α-methylstyrene may show improving effect of heat resistance. In an embodiment of the present invention, if the aromatic vinyl compound includes α-methylstyrene, α-methylstyrene may show increasing effect of heat resistance, and if the amount of the α-methylstyrene increases, the degree of heat resistance of the whole resin composition may increase, but if the amount of the α-methylstyrene is excessively high, gas generation may become severe due to depolymerization during processing using the resin composition.

In an embodiment of the present invention, (1) the butadiene-based graft copolymer mixture may include, based on the total weight of the mixture, (A) 5 wt % to 50 wt % of a first butadiene-based graft copolymer; (B) 0.5 wt % to 55 wt % of a second butadiene-based graft copolymer; and (C) 15 wt % to 85 wt % of a copolymer including a derived unit from a vinyl cyanide compound and a derived unit from an aromatic vinyl compound, and may particularly include 10 wt % to 40 wt %; 1 wt % to 50 wt %; and 20 wt % to 80 wt %, respectively.

If (1) the butadiene-based graft copolymer mixture includes (A) the first butadiene-based graft copolymer, (B) the second butadiene-based graft copolymer, and (C) the copolymer including the derived unit from a vinyl cyanide compound and the derived unit from an aromatic vinyl compound in the above-mentioned amount ranges, respectively, excellent impact strength, low frictional sound degree (RPN) may be shown and effects of decreasing remaining monomer (remaining compound) in the resin composition may be shown.

In an embodiment of the present invention, if (1) the butadiene-based graft copolymer mixture includes (A) the first butadiene-based graft copolymer, (B) the second butadiene-based graft copolymer, and (C) the copolymer including the derived unit from a vinyl cyanide compound and the derived unit from an aromatic vinyl compound, the total amount of (A) the first butadiene-based graft copolymer and (B) the second butadiene-based graft copolymer, and the amount of (C) the copolymer including the derived unit from a vinyl cyanide compound and the derived unit from an aromatic vinyl compound may satisfy a weight ratio of 20:80 to 80:20, particularly, 30:70 to 50:50, more particularly, 30:70 to less than 50:greater than 50.

If (1) the butadiene-based graft copolymer mixture satisfies the weight ratio of the total amount of the copolymers (A) and (B), and the amount of the copolymer (C), excellent balance among physical properties may be shown, and improving effect of frictional sound may be exhibited.

Meanwhile, in an embodiment of the present invention, (1) the butadiene-based graft copolymer mixture may be an ABS-based graft copolymer resin, for example, an acrylonitrile-butadiene-styrene (ABS) resin which is a copolymer of acrylonitrile-butadiene-styrene, and a flame retardant ABS resin, a heat resistant ABS resin, a non-glossy ABS resin, etc., which are copolymers of the acrylonitrile-butadiene-styrene copolymer with a monomer other than the acrylonitrile-butadiene-styrene.

In addition, if (1) the butadiene-based graft copolymer mixture includes (A) the first butadiene-based graft copolymer and (B) the second butadiene-based graft copolymer, each of (A) the first butadiene-based graft copolymer and (B) the second butadiene-based graft copolymer may be an ABS-based graft copolymer resin satisfying the above-mentioned conditions, particularly, an acrylonitrile-butadiene-styrene (ABS) resin which is a copolymer of acrylonitrile-butadiene-styrene, and a flame retardant ABS resin, a heat resistant ABS resin, a non-glossy ABS resin, etc., which are copolymers of the acrylonitrile-butadiene-styrene copolymer with a monomer other than the acrylonitrile-butadiene-styrene.

In addition, in an embodiment, (1) the butadiene-based graft copolymer mixture may further include (D) a heat resistant thermoplastic copolymer, and (D) the heat resistant thermoplastic copolymer may be a copolymer including a derived unit from a maleimide compound and a derived unit from an aromatic vinyl compound.

If (1) the butadiene-based graft copolymer mixture further includes (D) the heat resistant thermoplastic copolymer, the heat resistance of the resin composition according to an embodiment of the present invention may be further improved. (D) The heat resistant thermoplastic copolymer may be included in 5 parts by weight to 19 parts by weight, particularly, 10 parts by weight to 15 parts by weight based on 100 parts by weight of (1) the butadiene-based graft copolymer mixture. Here, the 100 parts by weight of (1) the butadiene-based graft copolymer mixture, which is the base of the amount included of (D) the heat resistant thermoplastic copolymer means total 100 parts by weight of a copolymer including (A) the first butadiene-based graft copolymer; (B) the second butadiene-based graft copolymer; and (C) the copolymer including the derived unit from a vinyl cyanide compound and the derived unit from an aromatic vinyl compound.

If (1) the butadiene-based graft copolymer mixture includes (D) the heat resistant thermoplastic copolymer in the above-mentioned amount range, the heat resistance of the resin composition according to an embodiment of the present invention may be further improved. If the amount is too small, the improving effect of heat resistance may be insufficient, and if the amount is excessively large, impact strength and flowability may be degraded.

Meanwhile, in an embodiment of the present invention, if (1) the butadiene-based graft copolymer mixture further includes (D) the heat resistant thermoplastic copolymer in addition to (A) to (C), the weight ratio of the total amount of (A) the first butadiene-based graft copolymer and (B) the second butadiene-based graft copolymer, and the total amount of (C) the copolymer including the derived unit from a vinyl cyanide compound and the derived unit from an aromatic vinyl compound and (D) the heat resistant thermoplastic copolymer may satisfy 20:80 to 80:20, particularly, 30:70 to 50:50, more particularly, 30:70 to less than 50:greater than 50.

If (1) the butadiene-based graft copolymer mixture includes the total amount of the copolymers (A) and (B), and the total amount of (C) the copolymer and (D) the heat resistant thermoplastic copolymer in the above-mentioned weight ratio, excellent mechanical and thermal properties may be shown.

In an embodiment of the present invention, (D) the heat resistant thermoplastic copolymer may include a derived unit from a maleimide compound and a derived unit from an aromatic vinyl compound in a weight ratio of 30:70 to 70:30, particularly, in a weight ratio of 40:60 to 60:40, more particularly, in a weight ratio of 50:50 to 60:40.

If the amount of the derived unit from a maleimide compound in (D) the heat resistant thermoplastic copolymer increases, the glass transition temperature increases, and if the derived unit from a maleimide compound and the derived unit from an aromatic vinyl compound are included in the weight ratio, appropriate impact strength and flowability may be shown, and excellent heat resistance may be also shown.

In the derived unit from a maleimide compound, the maleimide compound may include one selected from the group consisting of N-phenylmaleimide, N-ethylmaleimide and N-cyclohexyl maleimide, particularly, N-phenylmaleimide.

The aromatic vinyl compound in the derived unit from an aromatic vinyl compound may include one or more selected from the group consisting of styrene, α-methylstyrene, vinyltoluene, alkyl styrene which is substituted with $C_{1-3}$ alkyl group, and styrene which is substituted with halogen, particularly, styrene.

In an embodiment of the present invention, (D) the heat resistant thermoplastic copolymer may have a glass transition temperature of 150° C. to 250° C., particularly, a glass transition temperature of 180° C. to 220° C. Since (D) the heat resistant thermoplastic copolymer has the glass transition temperature range, effects of further improving the degree of heat resistance of the resin composition may be achieved.

(2) Graft Copolymer Including Derived Unit from Polyolefin-Based Polymer, Derived Unit from Vinyl Cyanide Compound and Derived Unit from Aromatic Vinyl Compound In the resin composition according to the present invention, (2) the graft copolymer including the derived unit from a polyolefin-based polymer, the derived unit from a vinyl cyanide compound and the derived unit from an aromatic vinyl compound may improve compatibility between (1) the butadiene-based graft copolymer and (3) the alpha olefin-based copolymer and may provide help in improving the stability of a resin and decreasing frictional sound.

In the resin composition according to the present invention, (2) the graft copolymer including the derived unit from a polyolefin-based polymer, the derived unit from a vinyl cyanide compound and the derived unit from an aromatic vinyl compound may be included in an amount of 0.1 wt % to 10 wt %, particularly, 0.5 wt % to 5 wt % with respect to the total weight of the resin composition. If (2) the graft copolymer including the derived unit from a polyolefin-based polymer, the derived unit from a vinyl cyanide compound and the derived unit from an aromatic vinyl compound is included in the above-mentioned amount range, the improving effect of compatibility and decreasing effect of frictional sound may be appropriately shown as described above. If the amount of (2) the graft copolymer is excessively small when compared with the above range, compatibility between (1) the butadiene-based graft copolymer and (3) the alpha olefin-based copolymer may be insufficient, and exfoliation phenomenon may occur at the surface of a resin, and if the amount of (2) the graft copolymer is excessively large when compared with the above range, mechanical properties of a final resin composition may be degraded and manufacturing cost may be excessively increased.

In the resin composition according to an embodiment of the present invention, (2) the graft copolymer including the derived unit from a polyolefin-based polymer, the derived unit from a vinyl cyanide compound and the derived unit from an aromatic vinyl-based compound, may be a graft copolymer obtained by graft copolymerizing a mixture of a vinyl cyanide compound and an aromatic vinyl compound in the presence of a polyolefin-based polymer core.

(2) The graft copolymer including the derived unit from a polyolefin-based polymer, the derived unit from a vinyl cyanide compound and the derived unit from an aromatic vinyl compound may include a polyolefin polymer core, a derived unit from a vinyl cyanide compound and a derived unit from an aromatic vinyl compound in a molecule, and the polyolefin polymer core may show compatibility with an olefin, and the derived unit from a vinyl cyanide compound and the derived unit from an aromatic vinyl compound may show compatibility with a butadiene-based graft copolymer composition.

(2) The graft copolymer including the derived unit from a polyolefin-based polymer, the derived unit from a vinyl cyanide compound and the derived unit from an aromatic vinyl compound may include a polyolefin polymer core, and a derived unit from a vinyl cyanide compound and a derived unit from an aromatic vinyl compound in a molecule in a weight ratio of 30:70 to 70:30, particularly, in a weight ratio of 40:60 to 60:40. In the resin composition according to an embodiment of the present invention, if (2) the graft copolymer including the derived unit from a polyolefin-based polymer, the derived unit from a vinyl cyanide compound and the derived unit from an aromatic vinyl compound is included in the amount ratio, surface exfoliation phenomenon due to the separation between (1) the butadiene-based graft copolymer mixture and (3) the alpha olefin-based copolymer may be prevented.

The polyolefin-based polymer in the derived unit from a polyolefin-based polymer may be any polyolefin-based polymers as long as it has compatibility with olefin, without specific limitation.

The vinyl cyanide compound in the derived unit from a vinyl cyanide compound may include one or more selected from the group consisting of acrylonitrile, methacrylonitrile and the derivatives thereof, particularly, acrylonitrile.

The aromatic vinyl compound in the derived unit from an aromatic vinyl compound may include one or more selected from the group consisting of styrene, α-methylstyrene, vinyltoluene, alkyl styrene which is substituted with $C_{1-3}$ alkyl group, and styrene which is substituted with halogen, particularly, styrene.

(3) Alpha Olefin-Based Copolymer (3) The alpha olefin-based copolymer may be a pectinate ethylene-alpha olefin copolymer in which a $C_4$ to $C_{30}$ alkyl group is bonded to the alpha position of polyethylene.

The alpha olefin-based copolymer is distinguished from an olefin-based polymer or copolymer of polyethylene and polypropylene by the presence of the $C_4$ to $C_{30}$ alkyl group bonded to the alpha position of polyethylene, and different from the olefin-based polymer or copolymer which shows insufficient compatibility or no compatibility with (1) the butadiene-based graft copolymer, the alpha olefin-based copolymer may show compatibility with (1) the butadiene-based graft copolymer due to the presence of the alkyl group which is bonded to the alpha position.

The molecular size of the alkyl group which is bonded to the alpha position is not limited, but considering the compatibility with a butadiene-based rubbery polymer core which is a rubber component of a butadiene-based graft copolymer, ethlene-1-butene copolymer in which $C_4$ alkyl is positioned at the alpha position may particularly be used.

Upon friction between materials, repeating phenomenon of stick and slip at the surfaces of the material arises, and mechanical energy accumulated in a polymer chain during a stick process upon friction produces frictional sound while being released during a slip process. If the resin composition includes alpha olefin, since an alpha olefin-based copolymer is nonpolar, low compatibility is shown with various kinds of materials, and thus, upon friction between materials, surface stickiness may be decreased and a glass transition temperature may be low, and mechanical energy accumulated during friction may be absorbed and transformed into thermal energy, thereby effectively preventing the generation of frictional sound.

The resin composition according to the present invention may include (3) the alpha olefin-based copolymer in an amount of 0.1 wt % to 10 wt %, particularly, 0.5 wt % to 5 wt %. If (3) the alpha olefin-based copolymer is included in the above-mentioned range, (3) the alpha olefin-based copolymer may effectively decrease the generation of frictional sound during the friction of the resin composition. If (3) the amount of the alpha olefin-based copolymer is excessively small when compared with the amount range, sufficient decreasing effect of frictional sound may not be shown, and if the amount is excessively large when compared with the amount range, the mechanical properties of the resin composition may be deteriorated, and exfoliation phenomenon may occur.

(3) The alpha olefin-based copolymer may have a weight average molecular weight of 30,000 to 200,000, particularly, a weight average molecular weight of 40,000 to 100,000. If the weight average molecular weight of (3) the alpha olefin-based copolymer is excessively small, tendency of coming of a final resin of the alpha olefin-based copolymer to the surface may increase, and phase separation may occur, and if the weight average molecular weight is excessively large, tendency of being present in a final resin of an alpha olefin copolymer may increase, and physical properties may be degraded and frictional sound index may increase. Accordingly, if (3) the alpha olefin-based copolymer has the weight average molecular weight in the above-mentioned range, the alpha olefin-based copolymer may be present at an appropriate position (depth) from the surface of the final resin, and excellent physical properties and appropriate decreasing effect of frictional sound may be shown.

(3) The alpha olefin-based copolymer may have the degree of crystallinity of 5% to 20%, particularly, the degree of crystallinity of 7% to 15%. If (3) the alpha olefin-based copolymer has the degree of crystallinity in the above-mentioned range, appropriate decreasing effect of frictional sound may be shown. If the degree of crystallinity is excessively small, frictional sound index value may increase, and if the degree of crystallinity is excessively large, compatibility may be deteriorated and exfoliation phenomenon may occur.

(3) The alpha olefin-based copolymer may have a melting temperature (Tm) of 20° C. to 70° C. and a glass transition temperature (Tg) of −100° C. to −20° C., particularly, a melting temperature (Tm) of 20° C. to 70° C. and a glass transition temperature (Tg) of −100° C. to −20° C. If (3) the alpha olefin-based copolymer has the melting temperature (Tm) and the glass transition temperature (Tg) in the above-mentioned ranges, appropriate decreasing effect of frictional sound may be shown. If the melting temperature (Tm) and the glass transition temperature (Tg) are low, surface stickiness may increase and frictional sound may increase, and if the melting temperature (Tm) and the glass transition temperature (Tg) are high, capability of transforming the frictional sound into thermal energy may be dampened and frictional sound may increase.

Meanwhile, in an embodiment of the present invention, if (3) the alpha olefin-based copolymer is an ethylene-1-butene copolymer, (3) the alpha olefin-based copolymer may have a ratio of ethylene and butyl in a molecule of 60:40 to 80:20 by a weight ratio, particularly, 70:30 to 75:25 by a weight ratio. If (3) the alpha olefin-based copolymer is the ethylene-1-butene copolymer and if the ratio of ethylene and butyl in a molecule satisfies the above-mentioned range, excellent compatibility with (1) the butadiene-based graft copolymer mixture may be shown, exfoliation phenomenon of a resin may not occur, the resin may show excellent mechanical properties, and excellent frictional sound decreasing effect may be exhibited.

In addition, the resin composition according to an embodiment of the present invention may additionally include other additives such as a lubricant, an antifriction agent, a releasing agent, a light and ultraviolet stabilizer, a flame-retardant agent, an antistatic agent, a coloring agent, a filler, and an impact reinforcing agent, as necessary, and other resin or other rubber component may be used together, within the range not deviating from the object of the present invention.

A thermoplastic resin prepared by the resin composition according to an embodiment of the present invention may include a resin included in the resin composition according to an embodiment of the present invention, the resin composition, or components of the resin composition. That is, the thermoplastic resin prepared by the resin composition according to an embodiment of the present invention may include (1) 80 wt % to 99.8 wt % of a butadiene-based graft copolymer mixture; (2) 0.1 wt % to 10 wt % of a graft copolymer including a derived unit from a polyolefin-based polymer, a derived unit from a vinyl cyanide compound and a derived unit from an aromatic vinyl-based compound; and (3) 0.1 wt % to 10 wt % of an alpha olefin-based copolymer.

If a risk-priority-number (PRN) value of the thermoplastic resin prepared by the resin composition according to an embodiment of the present invention was measured three times under standard conditions of VDA 230-206 standard to obtain an average value, the PRN value may be 5 or less, particularly, 4 or less, more particularly, 1 to 3.

In addition, if an average value was obtained by standing the thermoplastic resin prepared by the resin composition according to an embodiment of the present invention under standard conditions of VDA 230-206 standard at 80° C. and humidity of 95% for 350 hours and standing at 23° C. and humidity of 50% for 24 hours for aging, and measuring a risk-priority-number (PRN) value three times, the PRN value may be 5 or less, particularly, 4 or less, more particularly, 3 or less, further more particularly, 1 to 2.3.

The measurement of the risk-priority-number (PRN) value according to the standard conditions of VDA 230-206 standard may be performed using, for example, SSP-04 tester of Ziegler instrument GmbH. It is evaluated that if the risk-priority-number (PRN) value is 1 to 3, no frictional sound is generated, if 4 to 5, the generation and non-generation of frictional sound coexists, and if 6 to 10, frictional sound is generated.

In addition, the present invention may provide a molded product manufactured using the resin composition according to an embodiment.

The molded product may be any products without specific limitation as long as it may be manufactured using plastics, and particular examples may include housings of display products, cellular phones, lap tops, refrigerator, etc., diverse plastic parts, and car parts.

BEST MODE FOR CARRYING OUT THE INVENTION

Hereinafter, the present invention will be explained in more detail referring to embodiments and experimental embodiments. However, the embodiments and experimental embodiments are for illustrating the present invention, and the scope of the present invention is not limited thereto.

Example 1

<Preparation of Resin Composition>

A resin composition was prepared by mixing 22 wt % of (A) an ABS resin which had the butadiene-based rubbery polymer core content of 60 wt % and a particle diameter of 3,000 Å and which was prepared by emulsion polymerization, 2 wt % (B) an ABS resin which had the butadiene-based rubbery polymer core content of 12 wt %, a particle diameter of 12,000 Å and which was prepared by bulk polymerization, and 71 wt % of (C) an alpha-methylstyrene-acrylonitrile copolymer which had the acrylonitrile content of 30 wt %, 2 wt % of an ethylene-styrene-acrylonitrile (PE-SAN) copolymer (2) which had the ethylene content of 50 wt %, and 3 wt % of an ethylene-1-butene copolymer (3) which had a weight average molecular weight of 100,000, the degree of crystallinity of 9.7%, a melting temperature (Tm) of 32° C., a glass transition temperature (Tg) of −58° C., and a ratio of ethylene and butyl of 64:36.

<Preparation of Specimen>

To 100 parts by weight of the resin composition, 0.3 parts by weight of N'N-ethylene bis-stearimide (EBA) as a lubricant, and 0.2 parts by weight of Songnox1076 (Songwon Industrial Co.) and 0.2 parts by weight of PEP-24 (ADEKA Co.) as antioxidants were added, and the resultant product was melt, mixed and extruded to prepare a pellet. The extrusion was performed using a twin-screw extruder having L/D=29 and a diameter of 40 mm, and the cylinder temperature was set to 260° C. The pellet thus prepared was injection molded into a specimen for physical properties to prepare a specimen.

Examples 2 and 3

Resin compositions and specimens were obtained by the same method as in Example 1 except for preparing resin compositions using the amounts and components listed in Table 1 below.

Examples 4 and 5

Resin compositions and specimens were obtained by the same method as in Example 1 with the amounts listed in Table 1 below, except for additionally using a phenylmaleimide-styrene copolymer which had the phenylmaleimide content of 52 wt % during preparing the resin compositions of Examples 4 and 5.

In Table 1 below, the amount 0 means that the corresponding component was not used.

TABLE 1

| | Component | Example 1 (wt %) | Example 2 (wt %) | Example 3 (wt %) | Example 4 (wt %) | Example 5 (wt %) |
|---|---|---|---|---|---|---|
| (1) | (A) | 22 | 22 | 22 | 10 | 34 |
| | (B) | 2 | 2 | 2 | 45 | 15 |
| | (C) | 71 | 71 | 71 | 25 | 32 |
| | (D) | 0 | 0 | 0 | 15 | 15 |
| (2) | | 2 | 2 | 2 | 2 | 2 |
| (3) | (3-1) | 3 | 0 | 0 | 0 | 0 |
| | (3-2) | 0 | 3 | 0 | 0 | 0 |
| | (3-3) | 0 | 0 | 3 | 3 | 2 |

(1) Butadiene-based graft copolymer mixture:
(A) Butadiene-based graft copolymer (DP 270, LG Chem)
(B) Butadiene-based graft copolymer (ER 400, LG Chem)
(C) Alpha-methylstyrene-acrylonitrile copolymer (98UHM, LG Chem)
(D) Phenylmaleimide-styrene copolymer (MS_NB, Japan Denka)
(2) Ethylene-SAN copolymer (A1401, Nippon Oil & Fats Co.)
(3) Ethylene-1-butene copolymer: LG Chem
(3-1) Molecular weight (Mw): 100,000, degree of crystallinity: 9.7%, Tm = 32° C., Tg = −58° C., ethylene:butyl ratio = 64:36
(3-2) Molecular weight (Mw): 65,000, degree of crystallinity: 10.5%, Tm = 36° C., Tg = −54° C., ethylene:butyl ratio = 70:30
(3-3) Molecular weight (Mw): 42,000, degree of crystallinity: 12%, Tm = 57° C., Tg = −53° C., ethylene:butyl ratio = 72:28

Comparative Example 1

<Preparation of Resin Composition>

A resin composition was prepared by mixing 25 wt % of (A) an ABS resin which had the butadiene-based rubbery polymer core content of 60 wt % and a particle diameter of 3,000 Å, and which was prepared by emulsion polymerization, 60 wt % of (C) an alpha-methylstyrene-acrylonitrile copolymer which had the acrylonitrile content of 30 wt %, and 15 wt % of (D') a styrene-acrylonitrile (SAN) copolymer which had the acrylonitrile content of 31 wt %.

<Preparation of Specimen>

To 100 parts by weight of the resin composition, 0.5 parts by weight of N'N-ethylene bis-stearimide (EBA) as a lubricant, and 0.2 parts by weight of Songnox1076 (Songwon Industrial Co.) and 0.2 parts by weight of PEP-24 (ADEKA Co.) as antioxidants were added, and the resultant product was melt, mixed and extruded to prepare a pellet. The extrusion was performed using a twin-screw extruder having L/D=29 and a diameter of 40 mm, and the cylinder temperature was set to 260° C. The pellet thus prepared was injection molded into a specimen for physical properties to prepare a specimen.

Comparative Example 2

A resin composition and a specimen were obtained through the same method as in Comparative Example 1 with the amounts listed in Table 2 below, except for additionally using (2') a polyethylene-polystyrene copolymer (PE-PS) which had the ethylene content of 50 wt %.

Comparative Example 3

A resin composition and a specimen were obtained through the same method as in Comparative Example 1 with the amounts listed in Table 2 below, except for additionally using (2) an ethylene-styrene-acrylonitrile (PE-SAN) copolymer which had the ethylene content of 50 wt %.

Comparative Example 4

A resin composition and a specimen were obtained by the same method as in Comparative Example 1 except for preparing the resin composition using the amounts listed in Table 2 below.

Comparative Example 5

A resin composition and a specimen were obtained by the same method as in Comparative Example 1 and using the amounts listed in Table 2 below, except for using 20 wt % of (D) a phenylmaleimide-styrene copolymer which had the phenylmaleimide content of 52 wt % instead of (C) the styrene-acrylonitrile (SAN) copolymer which had the acrylonitrile content of 31 wt %.

Comparative Example 6

A resin composition and a specimen were obtained through the same method as in Comparative Example 1 with the amounts listed in Table 2 below, except for not using (C) the styrene-acrylonitrile (SAN) copolymer which had the acrylonitrile content of 31 wt %.

In Table 2 below, the amount 0 means that the corresponding component was not used.

(2) Flowability: Measurement was performed at conditions of 220° C. and 10 kg according to an ASTM D1238 method.

(3) Thermal deformation temperature: Measurement was performed using a specimen with a thickness of 6.4 mm according to an ASTM D648 method.

(4) Frictional sound: An average value was obtained by measuring risk-priority-number (PRN) three times before and after aging at each condition using SSP-04 tester of Ziegler instrument GmbH under the standard conditions of VDA 230-206 standard.

Aging conditions were standing at 80° C. in humidity of 95% for 350 hours, and standing at 23° C. in humidity of 50% for 24 hours, and it was evaluated that if a risk-priority-number (PRN) value was 1 to 3, there was no generation of frictional sound, if 4 to 5, frictional sound may or may not be present, and if 6 to 10, there was the generation of frictional sound. In Table 3 below, standard test conditions of VDA 230-206 standard using SSP-04 tester of Ziegler instrument GmbH are shown.

TABLE 3

| Step | Temperature | Humidity | Normal force (N) | Speed (mm/s) | Cycle | Displacement (mm) |
|---|---|---|---|---|---|---|
| 1 | 23° C. | 50% | 10 | 1 | 3 | 20 |
| 2 | 23° C. | 50% | 10 | 4 | 3 | 20 |
| 3 | 23° C. | 50% | 40 | 1 | 3 | 20 |
| 4 | 23° C. | 50% | 40 | 4 | 3 | 20 |

Physical properties evaluated by the above-mentioned methods are shown in Tables 4 and 5 below.

TABLE 2

| Component | | Comparative Example 1 (wt %) | Comparative Example 2 (wt %) | Comparative Example 3 (wt %) | Comparative Example 4 (wt %) | Comparative Example 5 (wt %) | Comparative Example 6 (wt %) |
|---|---|---|---|---|---|---|---|
| (1) | (A) | 25 | 23 | 23 | 27 | 33 | 27 |
| | (C) | 60 | 68 | 68 | 33 | 47 | 73 |
| | (D) | 0 | 0 | 0 | 0 | 20 | 0 |
| | (D') | 15 | 4 | 4 | 40 | 0 | 0 |
| (2) | (2) | 0 | 0 | 5 | 0 | 0 | 0 |
| | (2') | 0 | 5 | 0 | 0 | 0 | 0 |

(1) Butadiene-based graft copolymer mixture:
(A) Butadiene-based graft copolymer (DP 270, LG Chem,)
(C) Alpha-methylstyrene-acrylonitrile copolymer (98UHM, LG Chem,)
(D) Phenylmaleimide-styrene copolymer (MS_NB, LG Chem,)
(D') Styrene-acrylonitrile (SAN) copolymer (97HC, LG Chem,)
(2) Ethylene-SAN copolymer (A1401, Nippon Oil & Fats Co.)
(2') Polyethylene-polystyrene copolymer (PE-PS) (Nippon Oil & Fats Co.)

Experimental Example

With respect to the specimens manufactured by the Examples and the Comparative Examples, physical properties were evaluated by the methods below.

(1) IZOD impact strength (kgf·cm/cm): Measurement was performed by standing at room temperature of 23° C. for 24 hours, and making notch on the specimen with a thickness of 3.2 mm according to an ASTM D256 method.

TABLE 4

| | Example 1 | Example 2 | Example 3 | Example 4 | Example 5 |
|---|---|---|---|---|---|
| Izod impact strength (Kgcm/cm) | 8.8 | 9.4 | 9.1 | 9.2 | 20.3 |
| Flowability (g/10 min) | 10.8 | 11.5 | 11.7 | 8.3 | 5.2 |
| Thermal deformation temperature (° C.) | 101.2 | 101.2 | 100.4 | 103.2 | 103.4 |

TABLE 4-continued

| | | | Example 1 | Example 2 | Example 3 | Example 4 | Example 5 |
|---|---|---|---|---|---|---|---|
| Frictional sound grade | Before aging | 10 N, 1 mm/sec | 1.0 | 1.0 | 1.3 | 2.0 | 2.0 |
| | | 10 N, 4 mm/sec | 3.0 | 1.0 | 1.7 | 1.7 | 2.7 |
| | | 40 N, 1 mm/sec | 1.0 | 1.0 | 1.3 | 2.0 | 2.0 |
| | | 40 N, 4 mm/sec | 1.0 | 1.0 | 1.0 | 1.0 | 1.0 |
| | After aging | 10 N, 1 mm/sec | 2.0 | 2.0 | 2.3 | 2.0 | 2.3 |
| | | 10 N, 4 mm/sec | 1.0 | 1.3 | 1.0 | 1.0 | 3.0 |
| | | 40 N, 1 mm/sec | 2.0 | 2.0 | 2.3 | 2.0 | 2.0 |
| | | 40 N, 4 mm/sec | 1.0 | 1.0 | 1.0 | 2.3 | 1.0 |

TABLE 5

| | | | Comparative Example 1 | Comparative Example 2 | Comparative Example 3 | Comparative Example 4 | Comparative Example 5 | Comparative Example 6 |
|---|---|---|---|---|---|---|---|---|
| Izod impact strength (Kgcm/cm) | | | 21 | 12 | 14 | 25 | 15 | 16 |
| Flowability (g/10 min) | | | 8 | 12 | 11 | 12 | 3 | 6 |
| Thermal deformation temperature (° C.) | | | 93 | 91 | 92 | 89 | 102 | 98 |
| Frictional sound grade | Before aging | 10 N, 1 mm/sec | 3.7 | 3.0 | 3.3 | 1.7 | 2.0 | 2.3 |
| | | 10 N, 4 mm/sec | 2.7 | 1.0 | 4.0 | 2.0 | 3.7 | 5.0 |
| | | 40 N, 1 mm/sec | 2.7 | 1.3 | 1.3 | 3.7 | 2.0 | 2.7 |
| | | 40 N, 4 mm/sec | 5.0 | 2.6 | 2.0 | 4.0 | 1.0 | 1.0 |
| | After aging | 10 N, 1 mm/sec | 5.0 | 3.0 | 4.0 | 6.0 | 2.7 | 6.7 |
| | | 10 N, 4 mm/sec | 5.3 | 2.4 | 3.2 | 6.3 | 3.0 | 6.3 |
| | | 40 N, 1 mm/sec | 5.3 | 5.4 | 6.4 | 9.7 | 5.3 | 9.7 |
| | | 40 N, 4 mm/sec | 5.7 | 4.5 | 3.0 | 8.7 | 8.7 | 8.0 |

As confirmed in Tables 4 and 5, there was not much change in the frictional sound grade value before and after aging for the resin compositions of Examples 1 to 5, but the frictional sound grade was increased after aging for the resin compositions of Comparative Examples 1 to 6.

The invention claimed is:

1. A resin composition, comprising:
   (1) 80 wt % to 99.8 wt % of a butadiene-based graft copolymer mixture;
   (2) 0.1 wt % to 10 wt % of a graft copolymer comprising a derived unit from a polyolefin-based polymer, a derived unit from a vinyl cyanide compound and a derived unit from an aromatic vinyl-based compound; and
   (3) 0.1 wt % to 10 wt % of an alpha olefin-based copolymer,
   wherein (1) the butadiene-based graft copolymer mixture is an ABS-based graft copolymer composition comprising (A) a first butadiene-based graft copolymer comprising 40 wt % to 70 wt % of a butadiene-based rubbery polymer core and 30 wt % to 60 wt % of a graft shell comprising a derived unit from a vinyl cyanide compound and a derived unit from an aromatic vinyl compound; and (B) a second butadiene-based graft copolymer comprising 5 wt % to 30 wt % of a butadiene-based rubbery polymer core and 70 wt % to 95 wt % of a graft shell comprising a derived unit from a vinyl cyanide compound and a derived unit from an aromatic vinyl compound, and further comprising (C) a copolymer comprising a derived unit from a vinyl cyanide compound and a derived unit from an aromatic vinyl-based compound.

2. The resin composition according to claim 1, wherein (1) the butadiene-based graft copolymer mixture comprises based on a total weight of the mixture, (A) the first butadiene-based graft copolymer in 5 wt % to 50 wt %; (B) the second butadiene-based graft copolymer in 0.5 wt % to 55 wt %; and (C) the copolymer comprising the derived unit from the vinyl cyanide compound and the derived unit from the aromatic vinyl-based compound in 15 wt % to 85 wt %.

3. The resin composition according to claim 1, wherein, in (1) the butadiene-based graft copolymer mixture, a weight ratio of a total amount of (A) the first butadiene-based graft copolymer and (B) the second butadiene-based graft copolymer, and an amount of (C) the copolymer comprising the derived unit from the vinyl cyanide compound and the derived unit from the aromatic vinyl-based compound is 20:80 to 80:20.

4. The resin composition according to claim 1, wherein the derived unit from the aromatic vinyl-based compound of (C) the copolymer comprises a derived unit from α-methylstyrene.

5. The resin composition according to claim 1, wherein (C) the copolymer comprising the derived unit from the vinyl cyanide compound and the derived unit from the aromatic vinyl-based compound has a glass transition temperature of 100° C. to 150° C.

6. The resin composition according to claim 1, wherein (1) the butadiene-based graft copolymer mixture further comprises (D) a heat resistant thermoplastic copolymer, and the heat resistant thermoplastic copolymer is a copolymer comprising a derived unit from a maleimide compound and a derived unit from an aromatic vinyl compound.

7. The resin composition according to claim 6, wherein (D) the heat resistant thermoplastic copolymer is comprised in 5 parts by weight to 19 parts by weight based on 100 parts by weight of (1) the butadiene-based graft copolymer mixture.

8. The resin composition according to claim 6, wherein, in (1) the butadiene-based graft copolymer mixture, a weight ratio of a total amount of (A) the first butadiene-based graft copolymer and (B) the second butadiene-based graft copolymer, and a total amount of (C) the copolymer comprising the derived unit from the vinyl cyanide compound and the derived unit from the aromatic vinyl-based compound and (D) the heat resistant thermoplastic resin is 20:80 to 80:20.

9. The resin composition according to claim 1, wherein (2) the graft copolymer comprising the derived unit from a polyolefin-based polymer, the derived unit from a vinyl cyanide compound and the derived unit from an aromatic vinyl-based compound, is a graft copolymer comprising a polyolefin-based polymer core, a derived unit from a vinyl cyanide compound and a derived unit from an aromatic vinyl compound.

10. The resin composition according to claim 9, wherein (2) the graft copolymer comprising the derived unit from a polyolefin-based polymer, the derived unit from a vinyl cyanide compound and the derived unit from an aromatic vinyl-based compound comprises the polyolefin-based polymer core, and the derived unit from a vinyl cyanide compound and the derived unit from an aromatic vinyl compound in a weight ratio of 30:70 to 70:30.

11. The resin composition according to claim 1, wherein (3) the alpha olefin-based copolymer has a weight average molecular weight of 30,000 to 200,000.

12. The resin composition according to claim 1, wherein (3) the alpha olefin-based copolymer has a crystallization degree of 5% to 20%.

13. The resin composition according to claim 1, wherein (3) the alpha olefin-based copolymer has a melting temperature (Tm) of 20° C. to 70° C. and a glass transition temperature (Tg) of −100° C. to −20° C.

14. The resin composition according to claim 1, wherein (3) the alpha olefin-based copolymer is an ethylene-1-butene copolymer having a ratio of an ethylene derived unit and butene of 60:40 to 80:20 by weight.

15. A thermoplastic resin prepared using the resin composition of claim 1,
the thermoplastic resin has a PRN (risk-priority-number) value of 5 or less, when standing at 80° C. in humidity of 95% for 350 hours and standing at 23° C. in humidity of 50% for 24 hours for aging according to standard conditions of VDA 230-206 standard, and measuring the PRN value.

16. A resin composition, comprising:
(1) 80 wt % to 99.8 wt % of a butadiene-based graft copolymer mixture;
(2) 0.1 wt % to 10 wt % of a graft copolymer comprising a derived unit from a polyolefin-based polymer, a derived unit from a vinyl cyanide compound and a derived unit from an aromatic vinyl-based compound; and
(3) 0.1 wt % to 10 wt % of an alpha olefin-based copolymer,
wherein (3) the alpha olefin-based copolymer has a crystallization degree of 5% to 20%.

17. A resin composition, comprising:
(1) 80 wt % to 99.8 wt % of a butadiene-based graft copolymer mixture;
(2) 0.1 wt % to 10 wt % of a graft copolymer comprising a derived unit from a polyolefin-based polymer, a derived unit from a vinyl cyanide compound and a derived unit from an aromatic vinyl-based compound; and
(3) 0.1 wt % to 10 wt % of an alpha olefin-based copolymer,
wherein (3) the alpha olefin-based copolymer has a melting temperature (Tm) of 20° C. to 70° C. and a glass transition temperature (Tg) of −100° C. to −20° C.

* * * * *